(12) United States Patent
Inomata et al.

(10) Patent No.: US 10,466,775 B2
(45) Date of Patent: *Nov. 5, 2019

(54) METHOD AND APPARATUS FOR CHANGING A FIELD OF VIEW WITHOUT SYNCHRONIZATION WITH MOVEMENT OF A HEAD-MOUNTED DISPLAY

(71) Applicant: COLOPL, INC., Tokyo (JP)

(72) Inventors: Atsushi Inomata, Kanagawa (JP); Taichiro Shiraishi, Saitama (JP)

(73) Assignee: COLOPL, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,881

(22) Filed: Oct. 1, 2018

(65) Prior Publication Data
US 2019/0033963 A1    Jan. 31, 2019

Related U.S. Application Data

(63) Continuation of application No. 15/249,330, filed on Aug. 26, 2016, which is a continuation of application No. PCT/JP2016/062712, filed on Apr. 22, 2016.

(30) Foreign Application Priority Data

Sep. 16, 2015   (JP) .................................. 2015-182712

(51) Int. Cl.
*G06F 3/01*       (2006.01)
*G06T 11/60*     (2006.01)

(52) U.S. Cl.
CPC .............. *G06F 3/012* (2013.01); *G06T 11/60* (2013.01)

(58) Field of Classification Search
None
See application file for complete search history.

(56) References Cited

U.S. PATENT DOCUMENTS 5,742,264 A    4/1998   Inagaki et al.
6,011,526 A *  1/2000   Toyoshima ............. G06F 3/012
                                                  345/156
(Continued)

FOREIGN PATENT DOCUMENTS

CN    104076510 A    10/2014
CN    104160697 A    11/2014
(Continued)

OTHER PUBLICATIONS

Revenheart, https://www.youtube.com/watch?v=HCdHjM3xjVg; Aug. 2015.*

(Continued)

*Primary Examiner* — Chad M Dicke
(74) *Attorney, Agent, or Firm* — Hauptman Ham, LLP

(57) ABSTRACT

A method includes generating a visual field image to be visually recognized by a user within a virtual space image, the virtual space image forming a virtual space within which the user is immersed. The method also includes generating a transitional image to be visually recognized by the user during a transitional period, the visual field image being updated during the transitional period. The method further includes displaying the visual field image and the transitional image using a head mounted display. Generating the transitional image includes one or more of updating the visual field image in synchronization with a movement of the head mounted display; or updating the visual field image without synchronization with the movement of the head mounted display by generating a transitional image having a reduced information amount to be visually recognized by the user.

14 Claims, 7 Drawing Sheets

(56) References Cited

U.S. PATENT DOCUMENTS

| | | | | |
|---|---|---|---|---|
| 6,184,847 | B1* | 2/2001 | Fateh | G06F 3/011 345/8 |
| 6,369,952 | B1* | 4/2002 | Rallison | G02B 27/017 359/630 |
| 6,987,512 | B2* | 1/2006 | Robertson | G06F 3/04815 345/156 |
| 7,148,892 | B2* | 12/2006 | Robertson | G06F 3/04815 345/427 |
| 8,375,334 | B2* | 2/2013 | Nakano | G06F 1/1626 715/810 |
| 8,556,695 | B2* | 10/2013 | Nishimura | A63F 13/573 463/9 |
| 8,614,672 | B2* | 12/2013 | Ohta | A63F 13/02 345/158 |
| 8,716,973 | B1* | 5/2014 | Lammertse | G06F 3/016 318/560 |
| 9,724,601 | B2* | 8/2017 | Fujita | A63F 13/23 |
| 10,007,118 | B2* | 6/2018 | Border | G02B 27/0176 |
| 10,078,917 | B1* | 9/2018 | Gaeta | G06T 19/006 |
| 2002/0001397 | A1* | 1/2002 | Ishikawa | G02B 27/017 382/103 |
| 2002/0099257 | A1* | 7/2002 | Parker | A61M 21/00 600/27 |
| 2003/0234823 | A1 | 12/2003 | Sato et al. | |
| 2004/0100479 | A1* | 5/2004 | Nakano | G06F 1/1626 715/700 |
| 2004/0209684 | A1* | 10/2004 | Hisano | A63F 13/10 463/32 |
| 2006/0061567 | A1* | 3/2006 | Ouchi | G06T 13/20 345/419 |
| 2008/0063400 | A1* | 3/2008 | Hudson | A63H 30/04 398/106 |
| 2008/0070686 | A1* | 3/2008 | Satsukawa | A63F 13/005 463/37 |
| 2008/0207324 | A1* | 8/2008 | Hiroshige | A63F 13/10 463/33 |
| 2010/0085423 | A1* | 4/2010 | Lange | G02B 27/22 348/46 |
| 2010/0208033 | A1* | 8/2010 | Edge | G06F 3/012 348/46 |
| 2011/0001699 | A1* | 1/2011 | Jacobsen | G06F 3/012 345/157 |
| 2012/0050044 | A1* | 3/2012 | Border | A61M 21/02 340/573.1 |
| 2012/0092348 | A1* | 4/2012 | McCutchen | G06T 3/00 345/474 |
| 2012/0236025 | A1* | 9/2012 | Jacobsen | G06F 3/011 345/629 |
| 2012/0306933 | A1* | 12/2012 | Osako | A63F 13/26 345/672 |
| 2013/0241955 | A1 | 9/2013 | Tamaru | |
| 2014/0152699 | A1* | 6/2014 | Oh | G06T 13/80 345/635 |
| 2014/0268356 | A1* | 9/2014 | Bolas | G02B 27/0093 359/630 |
| 2014/0278847 | A1* | 9/2014 | Gallo | G06Q 30/0252 705/14.5 |
| 2014/0365944 | A1* | 12/2014 | Moore | G06F 3/0484 715/772 |
| 2015/0002465 | A1 | 1/2015 | Tsukahara et al. | |
| 2015/0169076 | A1* | 6/2015 | Cohen | G06F 3/04815 345/156 |
| 2016/0055675 | A1* | 2/2016 | Kasahara | G06T 19/006 345/633 |
| 2016/0129346 | A1* | 5/2016 | Mikhailov | H04N 13/271 463/33 |
| 2016/0140768 | A1* | 5/2016 | Sako | G06F 3/011 345/633 |
| 2016/0161744 | A1* | 6/2016 | Kobayashi | G02B 27/017 345/8 |
| 2016/0189429 | A1* | 6/2016 | Mallinson | G02B 26/10 345/633 |
| 2016/0262608 | A1* | 9/2016 | Krueger | A61B 3/0041 |
| 2016/0267720 | A1* | 9/2016 | Mandella | G06T 19/006 |
| 2016/0313790 | A1* | 10/2016 | Clement | G06F 3/011 |
| 2016/0317915 | A1* | 11/2016 | Onda | A63F 13/2145 |
| 2016/0361632 | A1* | 12/2016 | Fujita | A63F 13/23 |
| 2016/0361649 | A1* | 12/2016 | Hayashi | A63F 13/525 |
| 2017/0006275 | A1* | 1/2017 | Gerard | G09G 3/001 |
| 2017/0266554 | A1* | 9/2017 | Marks | A63F 13/352 |
| 2017/0269713 | A1* | 9/2017 | Marks | A63F 13/335 |
| 2017/0365102 | A1* | 12/2017 | Huston | G06T 19/006 |

FOREIGN PATENT DOCUMENTS

| | | |
|---|---|---|
| JP | 8-292394 A | 11/1996 |
| JP | H11-133347 A | 5/1999 |
| JP | 11-161190 A | 6/1999 |
| JP | 2003-337963 A | 11/2003 |
| JP | 2007-116309 A | 5/2007 |
| JP | 2010-97472 A | 4/2010 |
| JP | 2015-64868 A | 4/2015 |
| WO | 2012/063542 A1 | 5/2012 |

OTHER PUBLICATIONS

Office Action in CN Application No. 201680066279.0, dated Apr. 2, 2019. 13pp.

* cited by examiner

METHOD AND APPARATUS FOR CHANGING A FIELD OF VIEW WITHOUT SYNCHRONIZATION WITH MOVEMENT OF A HEAD-MOUNTED DISPLAY

CROSS-REFERENCE TO RELATED APPLICATION

The present application is a continuation of U.S. patent application Ser. No. 15/249,330 filed on Aug. 26, 2016, which is a continuation of International Application Number PCT/JP2016/062712, filed Apr. 22, 2016, which claims priority to Japanese Patent Applications No. 2015-182712, filed Sep. 16, 2015. The disclosures of all of the above-listed prior-filed applications are hereby incorporated by reference herein in their entirety.

BACKGROUND

Virtual reality environments often provide a virtual space in which a user is immersed. The user sometimes perceives the virtual space by way of a head mounted display (hereinafter referred to as "HMD") that presents the virtual space to the user. Virtual reality users occasionally experience visually induced motion sickness as a result of being immersed in the virtual space.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
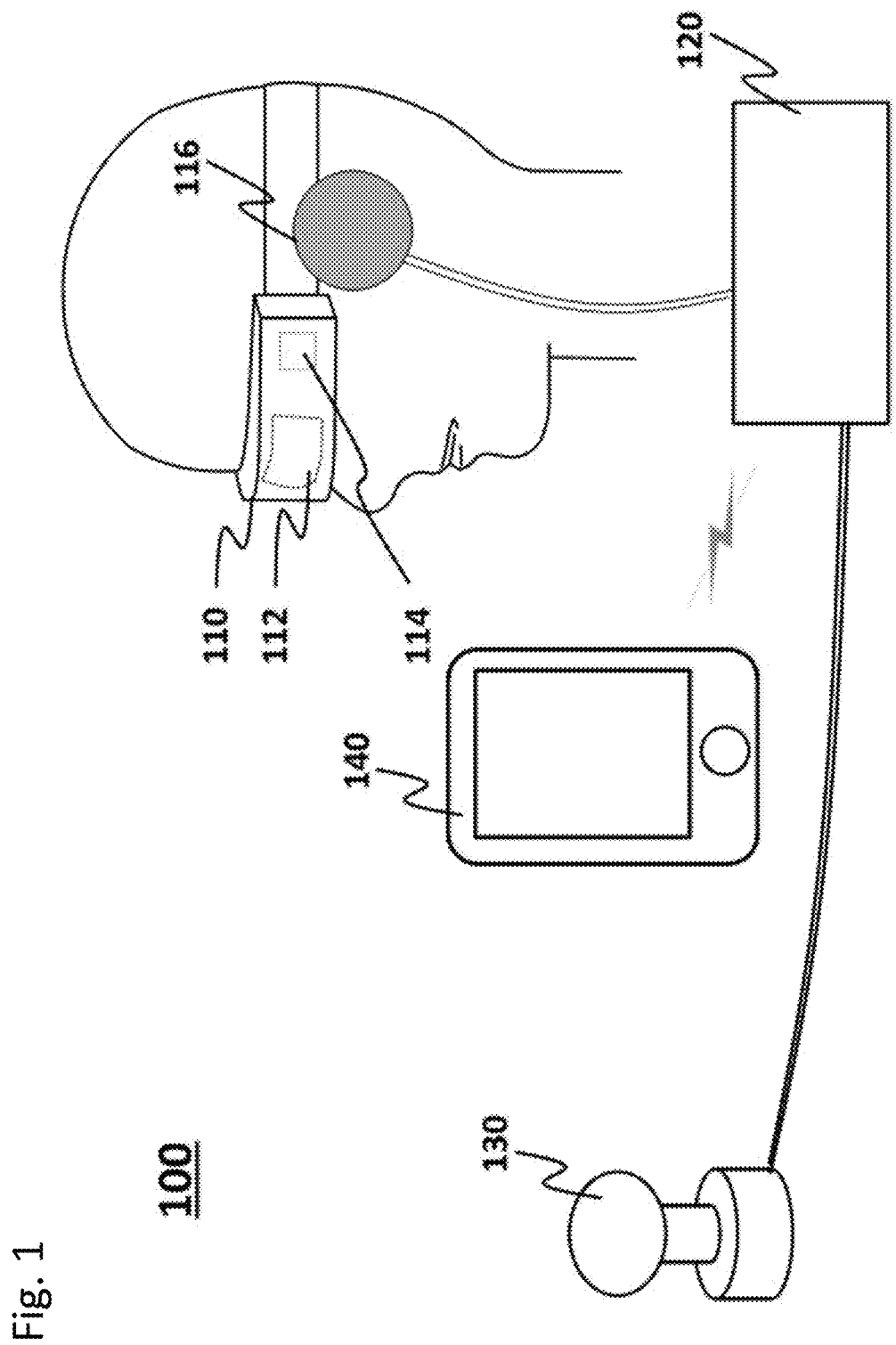
FIG. 1 is a diagram of a system having a HMD, in accordance with some embodiments.

Various aspects of the present disclosure are directed to reducing visually induced motion sickness (so-called VR sickness) caused when a virtual reality (hereinafter referred to as "VR") is provided by an HMD.

Some embodiments discussed herein include one or more of the following items.

(Item 1) A virtual space providing method for providing a virtual space to be displayed on a head mounted display, which allows a user to immerse himself or herself therein, including: a visual field image calculation step of generating a visual field image to be visually recognized by the user within a virtual space image that forms the virtual space that allows the user to immerse himself or herself therein; a transitional image generation step of generating a transitional image to be visually recognized by the user during a transitional period for updating the visual field image; and a display step of displaying the visual field image and the transitional image on the head mounted display, in which: the transitional image generation step includes: a first visual field image updating step of updating the visual field image in synchronization with a movement of the head mounted display; and a second visual field image updating step of updating the visual field image without synchronization with the movement of the head mounted display; and the second visual field image updating step includes generating a transitional image having a reduced information amount to be visually recognized by the user as the transitional image to be visually recognized by the user during the transitional period for updating the visual field image.

(Item 2) The virtual space providing method according to Item 1, in which the second visual field image, updating step further includes: updating the visual field image by moving a virtual camera configured to define the visual field image; and generating the transitional image when a moving amount of the virtual camera exceeds a predetermined amount.

(Item 3) The virtual space providing method according to Item 1 or 2, in which: the second visual field image updating step further includes updating the visual field image by moving a virtual camera configured to define the visual field image toward a direction of a visual axis of the virtual camera; and the transitional image is an image obtained by reducing the information amount to be visually recognized by the user within an area excluding a predetermined range including the visual axis.

(Item 4) The virtual space providing method according to any one of Items 1 to 3, in which the second visual field image updating step further includes updating the visual field image by moving a virtual camera configured to define the visual field image at speed equal to or faster than a predetermined speed.

(Item 5) The virtual space providing method according to Item 4, in which the predetermined speed is equal to or faster than 200°/second when the virtual camera moves so as to revolve about a predetermined point within the virtual space.

(Item 6) The virtual space providing method according to Item 5, in which the predetermined speed is equal to or faster than 300°/second.

(Item 7) A program for causing a computer to execute the virtual space providing method of any one of Items 1 to 6.

FIG. 1 is a diagram of an HMD system 100, in accordance with some embodiments.

HMD system 100 includes an HMD 110, a control circuit unit 120, at least one of a position tracking camera (e.g., a position sensor) 130 or a sensor 114 that is configured to serve as a motion sensor, and an external controller 140. In some embodiments, the external controller 140 is optionally excluded from the HMD system 100.

The HMD 110 includes a display 112, the sensor 114, and a headphone 116. In some embodiments, one or more speakers or headphones provided separately from the HMD 110 are optionally used as an alternative to, or in addition to, the headphone 116 included in the HMD 110.

The display 112 comprises a non-transmissive display device configured to completely cover a visual field of a wearer of the HMD 110. In some embodiments, the display 112 is configured to allow the wearer of the HMD to only observe an image displayed by the display 112. The wearer who is wearing the HMD 110 loses all the visual field of the external world, and is therefore completely immersed in a virtual space displayed in accordance with an application executed by the control circuit unit 120. In some embodiments, the display 112 is configured to at least partially allow the wearer of the HMD to see beyond the image displayed by the display 112.

The sensor 114 included in the HMD 110 is fixed in the vicinity of the display 112. The sensor 114 includes at least one of a geomagnetic sensor, an acceleration sensor, a tilt (angular velocity or gyro) sensor, or other suitable type of sensor configured to detect various kinds of movement of the HMD 110 and/or the display 112 worn on a head part of the wearer of the HMD 110. In some embodiments, the sensor 114 is positioned remote from the HMD 110, for example, on a device held or controlled by the user.

The control circuit unit 120 is configured to cause the HMD 110 to carry out an operation for causing the wearer of the HMD 110 to be immersed in a virtual space expressed as a three-dimensional virtual space. In some embodiments, the virtual space is other than a three-dimensional virtual space, for example a two-dimensional space, or other suitable quantity of perceivable dimensions.

The control circuit unit 120 is configured as hardware, including at least one processor. In some embodiments, the control circuit unit 120 is one or more of a computer such as a personal computer or a server computer connected through a network. In some embodiments, the hardware by which the control circuit unit 120 is implemented is an arbitrary computer including one or more of a central processing unit (CPU), a main storage, an auxiliary storage, a transmitter/receiver unit, a display unit, and an input unit that are communicatively coupled with one another through, for example, a bus. In some embodiments, the control circuit unit 120 is provided separately from the HMD 110. In some embodiments, the control circuit unit 120 is included as a component of the HMD 110. In some embodiments, the control circuit unit 120 is mounted inside the HMD 110. In some embodiments, the control circuit unit 120 is mounted on the HMD 110. In some embodiments, the control circuit unit 120 is at least partially inside the HMD 110. In some embodiments the control circuit unit 120 is divided between a component of the HMD 110 and one or more separate hardware components. In some embodiments, the control circuit unit 120 is implemented on a side of a server computer (not shown) connected through a network.

The position tracking camera 130 is communicably connected with the control circuit unit 120, and is configured to track the position of the HMD 110. In some embodiments, the position tracking camera 130 comprises one or more of an infrared sensor, a plurality of optical cameras, or some other suitable type of image sensor. The HMD system 100 receives the position of the HMD 110, to thereby be able to accurately associate the position of a virtual camera within the virtual space and the position of the wearer within a real space with one another.

The external controller 140 is a general user terminal. In some embodiments, the external controller 140 is one or more of a console for a game, a portable processing device, a portable device including a touch display, a smartphone, a personal digital assistant (PDA), a tablet computer, a laptop personal computer (PC), a device with which a user interacts by way of a user interface, or other suitable user equipment. The external controller 140 comprises at least one processor. In some embodiments, the external controller 140 includes one or more of a CPU, a main storage, an auxiliary storage, a transmitter/receiver unit, a display unit, or an input unit that are communicatively coupled with one another through, for example, a bus.

One or more of the control circuit unit 120 or the external controller 140 is configured to provide an interface with which the user is able to interact. In some embodiments, the external controller 140 includes one or more of a touch screen, keyboard, button, voice recognition input, motion sensitive input, or other suitable input device by which the wearer of the HMD 110 can issue various operation instructions to interact with the virtual space.

Figure 2:
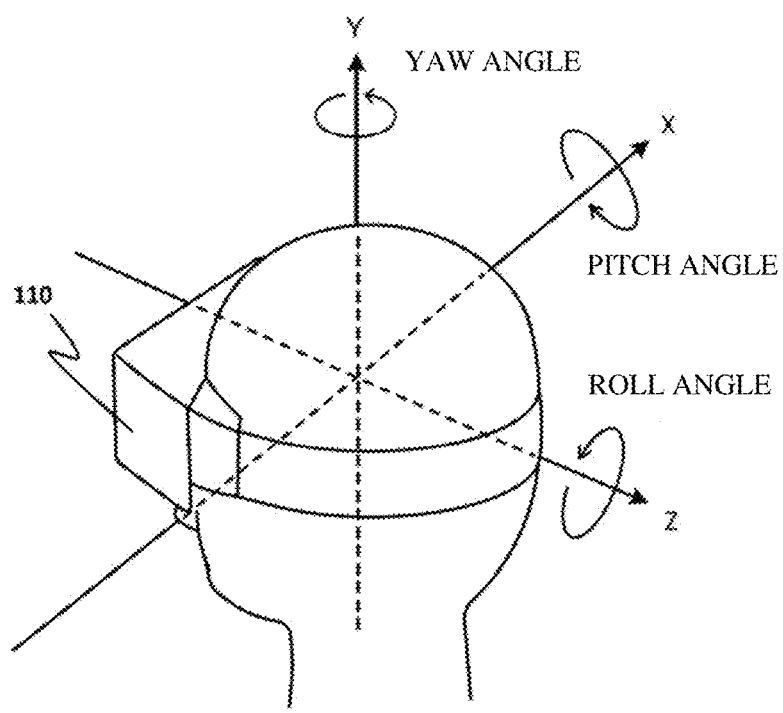
FIG. 2 is a diagram of an example movement of a head part of the HMD worn by a user, in accordance with some embodiments.

FIG. 2 is a diagram of an example movement of a head part of the HMD worn by a user, in accordance with some embodiments. The movement of the head part is capable of being detected by at least one of the position tracking camera 130 or the sensor 114 included in the HMD system 100. As illustrated in FIG. 2, XYZ-axes are defined, with the head part of the wearer of the HMD 110 being set as a center. The axis of a vertical direction in which the wearer stands upright is set as the Y-axis, the axis of a direction that is perpendicular to the Y-axis and that connects the center of the display 112 to the wearer is set as the Z-axis, and the axis of a direction perpendicular to the Y-axis and the Z-axis is set as the X-axis. The sensor 114 is configured to detect angles about the respective axes (e.g., a tilt determined based on a yaw angle indicating a rotation about the Y-axis, a pitch angle indicating a rotation about the X-axis, and a roll angle indicating a rotation about the Z-axis). The control circuit unit 120 is configured to determine, based on a change over time of the angles, angle (tilt) information data for controlling the virtual camera—which is configured to define visual field information. The movement of the head part of the wearer of the HMD 110 is detected based on detection information having six degrees of freedom. In some embodiments, the movement of the head part of the wearer of the HMD 110 is detected based on a different quantity of degrees of freedom.

A virtual camera 300 is controlled based on the movement of the HMD 110. The visual field visually recognized by a user is defined by a visual axis of the virtual camera 300. The movement of the HMD 110 within the real space and the movement of the virtual camera within the virtual space are associated with each other so that the visual axis corresponds to a Z-axis direction of the HMD 110.

In some embodiments, the visual field visually recognized by the user is controlled without depending on the movement of the HMD 110. For example, the visual field, in some embodiments, is controlled based on an input with respect to the external controller 140. In some embodiments, the virtual camera 300 automatically moves within the virtual space without the movement of the HMD 110 or without an input with respect to the external controller 140. In some embodiments, the automatic movement, or a selection to use the an automatic movement option, of the virtual camera 300 is based on a context within which the virtual space is used.

Figure 3:
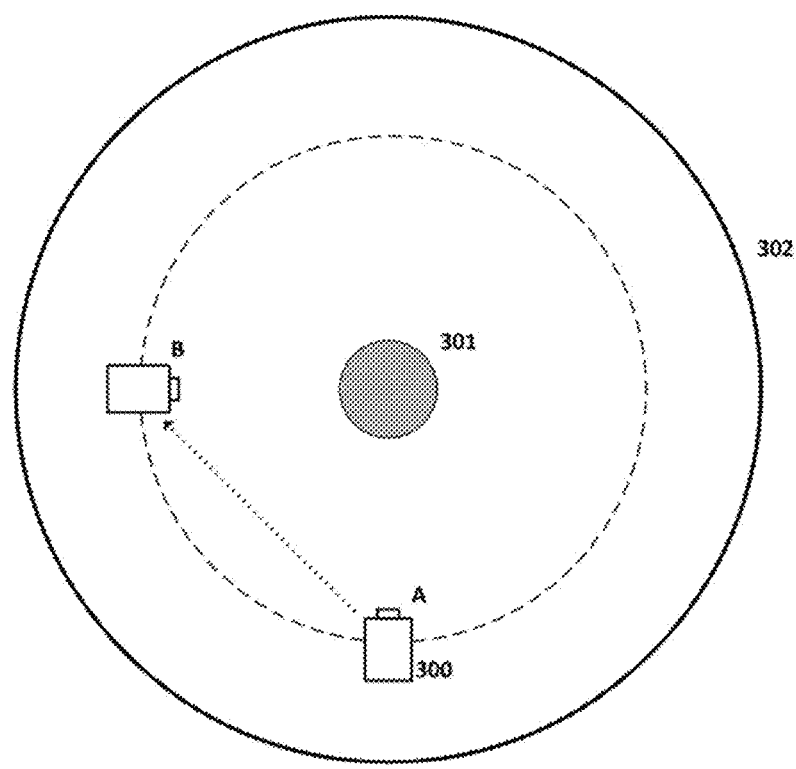
FIG. 3 is a diagram of an example movement of a virtual camera, in accordance with some embodiments.
Figure 4:
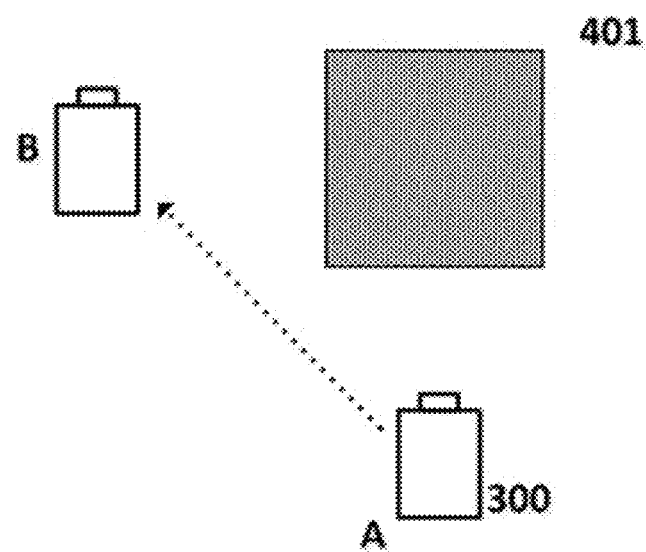
FIG. 4 is a diagram of an example movement of a virtual camera, in accordance with some embodiments.

FIG. 3 and FIG. 4 are diagrams of example movements of the virtual camera 300 exhibited when the visual field visually recognized by the user is controlled without depending on the movement of the HMD 110, in accordance with some embodiments.

In FIG. 3, an object 301 is placed within a virtual space 302. When the user conducts an input for controlling the virtual camera 300 with respect to the external controller 140, the virtual camera 300 is moved clockwise so as to revolve about the object 301. With this operation, the virtual camera 300 revolves about the object 301 by 90° clockwise to be moved from a start point A to an end point B, and the orientation of the virtual camera 300 is controlled so as to face the object 301.

In some embodiments, the motion of the virtual camera 300 is not limited to a revolving motion. For example, in some embodiments, the virtual camera 300 is subjected to a parallel translation from point A to point B (see, e.g., FIG. 4). In FIG. 4, the virtual camera 300 moves to the same position as that illustrated in FIG. 3, but the orientation of the virtual camera 300 is not controlled so as to face an object 401.

In FIG. 4, a visual field image is updated in association with the movement of the virtual camera 300 within the virtual space. The control circuit unit 120 is configured to cause the visual field image to be updated by at least one of two different methods for updating the visual field image, and/or one or more other methods for updating the visual field image. For example, a first method of updating the visual field image includes a case in which the movement of the HMD 110 is synchronized with the movement of the virtual camera 300, and second method of updating the visual field image includes a case in which the movement of the HMD 110 is not synchronized with the movement of the virtual camera 300. In the latter case, the visual field image is updated while generating a transitional image having a reduced information amount to be visually recognized by the wearer of the HMD 110 during a transitional period in which the virtual camera 300 is moved from point A to point B. In some embodiments, the reduced information amount of the transitional image is associated with image quality.

Figure 5:
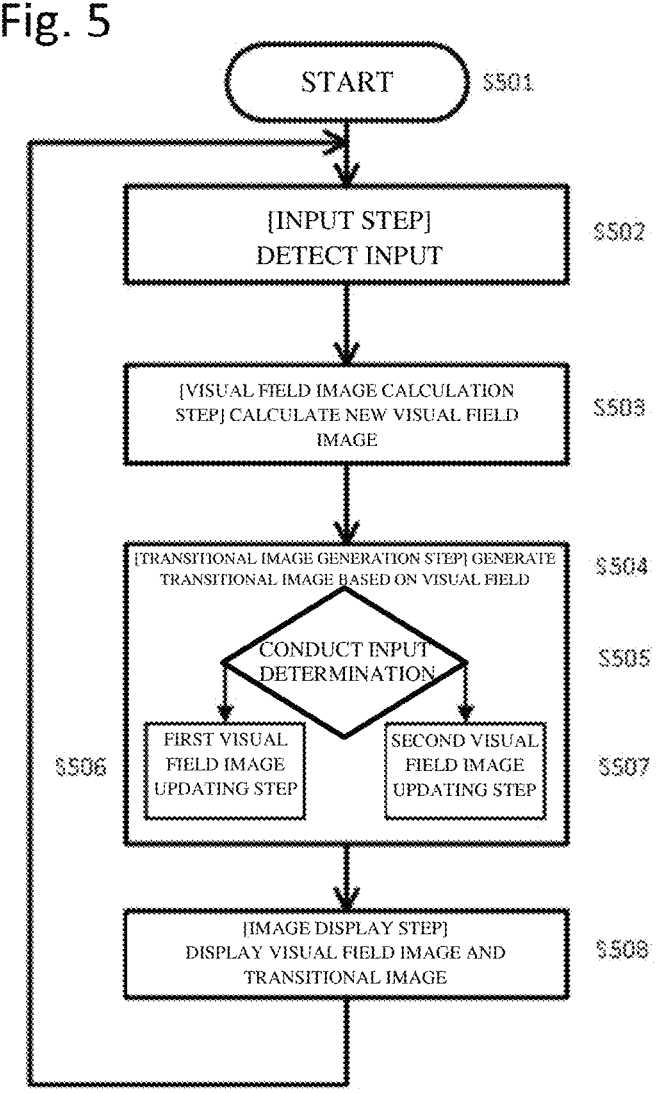
FIG. 5 is a flowchart of a process for providing a virtual space, in accordance with some embodiments.

FIG. 5 is a flowchart of a process 500 for providing a virtual space, in accordance with some embodiments. In some embodiments, the process 500 is at least partially executed by a processor, or a device including a processor such a control circuit unit 120.

In step S502, an input for moving the virtual camera 300 within the virtual space is detected. The input represents, for example, a movement of the HMD 110 or an input through the external controller 140.

In step S503, the virtual camera 300 within the virtual space is moved based on the input. A new position and direction of the virtual camera 300 at the end point (e.g., point B) to which the virtual camera 300 is to be moved are identified. The visual field image at a moving destination is then calculated based on the direction of the visual axis and the position of the virtual camera 300 at the moving destination.

In some embodiments, the virtual camera 300 automatically moves within the virtual space irrespective of the input for defining the movement of the virtual camera 300. In this case, the new position and direction of the virtual camera 300 to be exhibited after the movement are calculated irrespective of the input.

In step S504, the transitional image to be visually recognized by the user during the transitional period for updating the visual field image is generated. In the transitional image generation step of step S504, the control circuit unit 120 determines whether the virtual camera 300 is to be moved when the movement of the HMD 110 is synchronized with the movement of the virtual camera 300, or whether the virtual camera 300 is to be moved when the movement of the HMD 110 is not synchronized with the movement of the virtual camera 300 (i.e., step S505).

In step S506, if the control circuit unit 120 determines the visual field image is to be updated in synchronization with the movement of the HMD 110, the control circuit unit 120 updates the visual field image without displaying the transitional image. That is, in a first visual field image updating step of step S506, the transitional image is not generated. This is because the user hardly experiences visually induced motion sickness when the visual field of the user within the virtual space is synchronized with the movement of the HMD 110.

In step S507, if the control circuit unit 120 determines the visual field image is to be updated without synchronization with the movement of the HMD 110, the control circuit unit 120 updates the visual field image while displaying the transitional image. That is, in a second visual field image updating step of step S507, the transitional image is generated.

In some embodiments, the control circuit unit 120 is configured to determine whether a moving amount of the virtual camera 300 exceeds a predetermined threshold value. This is because, when the moving amount of the visual field is small, the user hardly experiences the visual motion sickness, even when the movement of the visual field that is not synchronized with the movement of the head part is presented to the user.

For example, if the control unit 120 determines that the moving amount of the virtual camera 300 does not exceed the predetermined threshold value, the control unit 120 causes the first visual field image updating step of step S506 to be executed. Accordingly, if the control unit 120 determines that the moving amount of the virtual camera 300 exceeds the predetermined threshold value, the control unit 120 causes the second visual field image updating step of step S507 to be executed, and the transitional image is generated.

In step S508, the generated visual field image and the generated transitional image at the moving destination of the virtual camera 300 are sent to the HMD 110 to be displayed by the display 112. In accordance with some embodiments, if the first visual field image updating step of step S506 is executed, the visual field image is updated without the transitional image being displayed, and if the second visual field image updating step of step S507 is executed, the visual field image is updated while the transitional image is being displayed. Therefore, in a case where the visual field image is updated without synchronization with the movement of the HMD 110, even when the user visually recognizes the transitional image that is not synchronized with the movement of the head part, the information amount recognized from the transitional image by the user is reduced—which allows the user to hardly experience the visually induced motion sickness.

Figure 6B:
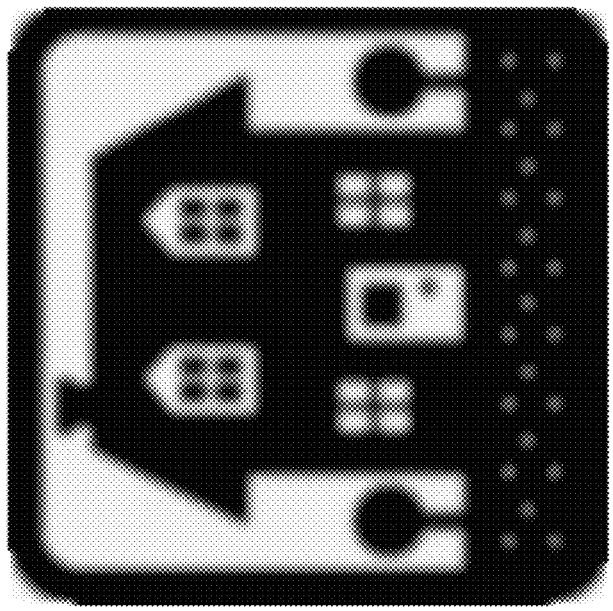
FIG. 6B is a diagram of a transitional image, in accordance with some embodiments.
Figure 6A:
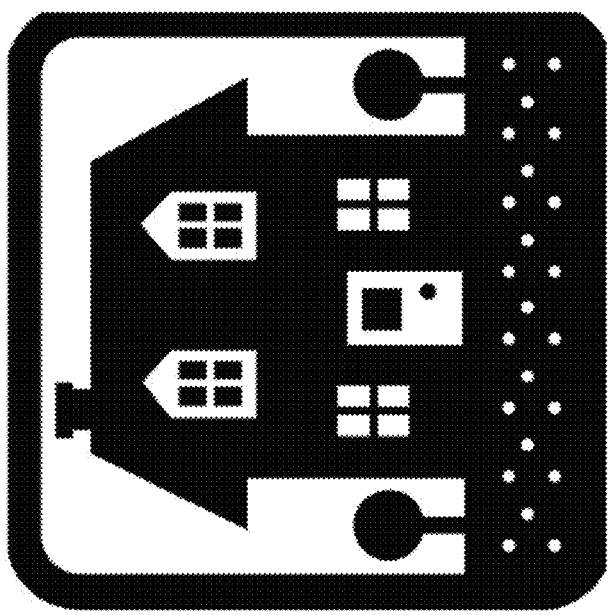
FIG. 6A is a diagram of a visual field image, in accordance with some embodiments.

FIG. 6A is a diagram of a visual field image, in accordance with some embodiments.

FIG. 6B is a diagram of a transitional image, in accordance with some embodiments.

In FIG. 6B, the entirety of the transitional image has been subjected to processing for reducing the information amount to be visually recognized by the user. Compared to the visual field image shown in FIG. 6A, the resolution of the transitional image shown in FIG. 6B is reduced as a whole. Also, compared to the visual field image shown in FIG. 6A, the contrast of the transitional image shown in FIG. 6B is reduced as a whole.

In some embodiments, the control circuit unit 120 is configured to cause a transitional image to be generated when the virtual camera 300 exhibits one or more of the following movements within the virtual space:
- when moving toward an X-axis direction or a Y-axis direction;
- when exhibiting such a movement as to rotate about the Y-axis in terms of the yaw angle; or
- when exhibiting such a movement as to rotate about the X-axis in terms of the pitch angle.

Figure 7A:
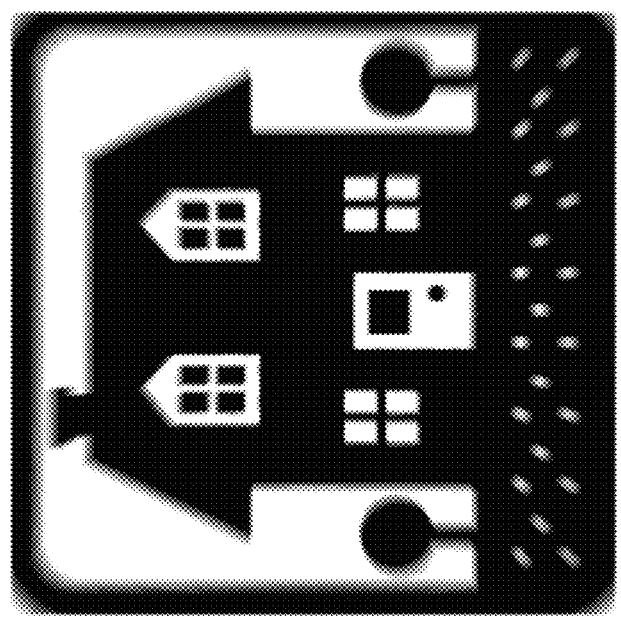
FIG. 7A is a diagram of a visual field image, in accordance with some embodiments.

FIG. 7A is a diagram of a visual field image, in accordance with some embodiments.

Figure 7B:
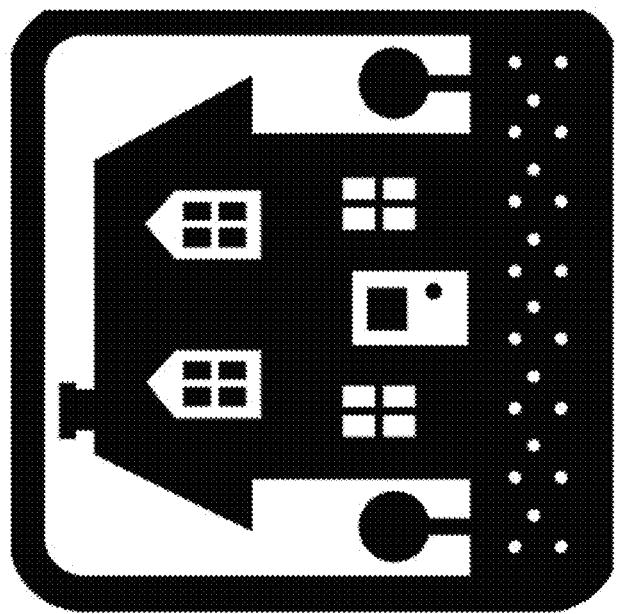
FIG. 7B is a diagram of a transitional image, in accordance with some embodiments.

FIG. 7B is a diagram of a transitional image, in accordance with some embodiments.

In FIG. 7B, an entirety of the transitional image shown in FIG. 7B has been subjected to processing for reducing the information amount to be visually recognized by the user compared to the visual field image shown in FIG. 7A. Compared to the visual field image shown in FIG. 7A, the resolution of the transitional image shown in FIG. 7B is not reduced as a whole like the resolution of the transitional image shown in FIG. 6B. Instead, the transitional image shown in FIG. 7B has been subjected to processing for reducing the information amount to be visually recognized by the user within an area excluding a predetermined range including the visual axis positioned at the center of the visual field image (i.e., within an area outside a fixed range).

In some embodiments, the circuit control unit 120 is configured to cause a transitional image to be generated when the virtual camera 300 exhibits one or more of the following movements within the virtual space:
- when moving toward the Z-axis direction; or
- when exhibiting such a movement as to rotate about the Z-axis in terms of the roll angle.

In some embodiments, the transitional image is not limited to one that is generated based on the processing discussed above, resulting in a transitional image that has a reduced information amount to be visually recognized by the user in at least a part of the visual field image. For example, when the visual field image is to be updated without synchronization with the movement of the HMD 110, the visual field image is optionally updated while moving the virtual camera 300 at high speed.

For example, if the visual field image of the virtual camera 300 is continuously displayed during the transitional period while the virtual camera 300 is moved at a high speed from point A to point B, the displayed visual field image changes drastically. Such a drastic change in the visual field information may prevent visually induced motion sickness, because a user may not be able to completely recognize the visual field image due to a limitation in reaction speed of the user's sense of sight. As such the amount of visual field information that the user is able to visually recognize during the transitional period is suppressed, and the visually induced motion sickness can be prevented.

Accordingly, in some embodiments, the virtual camera 300 is configured to be moved, or caused to be moved by the control circuit unit 120 for example, at an angular velocity of at least 200°/second. In some embodiments, the virtual camera 300 is configured to be moved, or caused to be moved, at an angular velocity of at least 250°/second. In some embodiments, the virtual camera 300 is configured to be moved, or caused to be moved, at an angular velocity of at least 300°/second.

In an example experiment, Applicants found that, in a case of using an HMD configured to conduct display at 75 frames/second, visually induced motion sickness was successfully prevented by a quantifiable amount in accordance with a predefined specification by moving the virtual camera 300 at an angular velocity of 45°/11 frames (307°/second).

In some embodiments, the transitional images described above are displayed in combination. For example, during the transitional period for updating the visual field image, the visual field image is subjected to the processing for reducing the information amount of the visual field image to be visually recognized by the user while the virtual camera 300 is moved at high speed.

Figure 8:
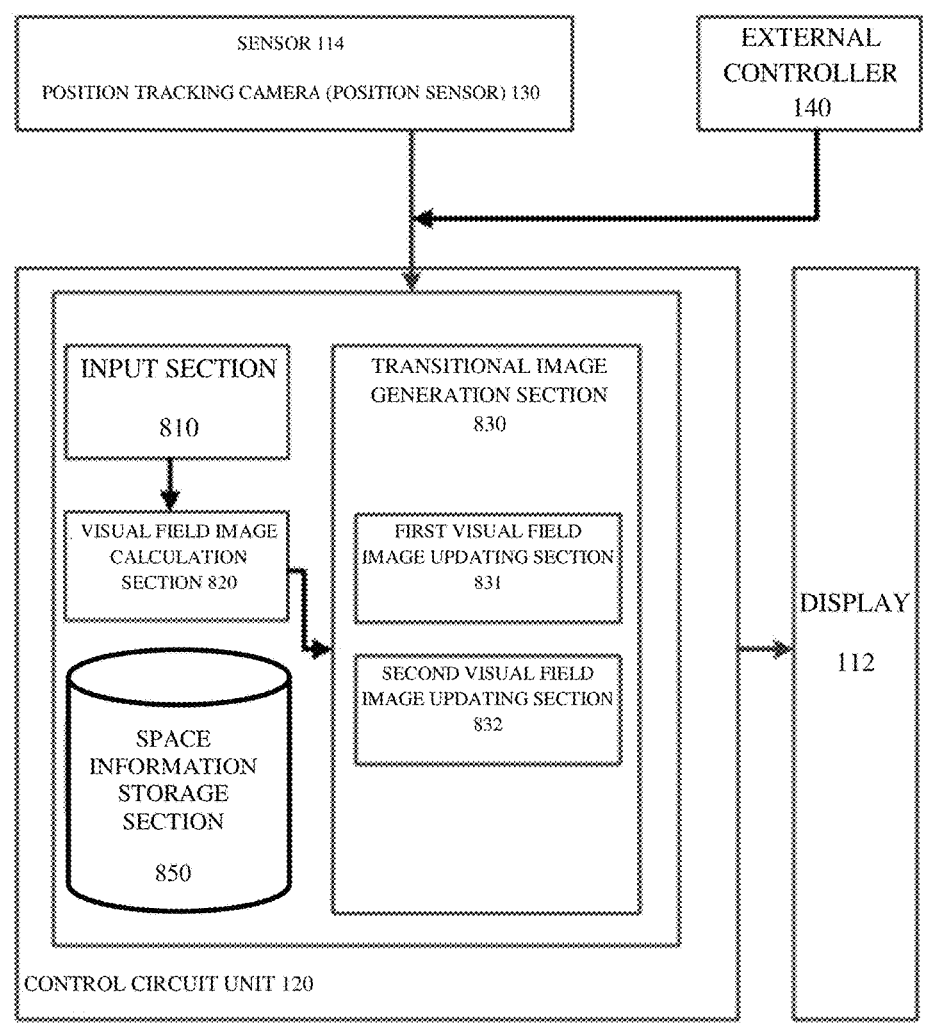
FIG. 8 is a block diagram of a device usable to implement one or more embodiments.

FIG. 8 is a block diagram of a device, such as control circuit unit 120, usable to implement one or more embodiments.

The control circuit unit 120 includes an input section 810, a visual field image calculation section 820, a transitional image generation section 830, a first visual field image updating section 831, and a second visual field image updating section 832. The input section 810 is configured to receive one or more inputs from at least one of the sensor 114 or the position tracking camera 130, and/or the external controller 140, and to execute the input step of step S502. The visual field image calculation section 820 is configured to execute a processing corresponding to the visual field image calculation step of step S503. The transitional image generation section 830 is configured to execute a processing corresponding to the transitional image generation step of step S504. The first visual field image updating section 831 is configured to execute a processing corresponding to the first visual field image updating step of step S506. The second visual field image updating section 832 is configured to execute a processing corresponding to the second visual field image updating step of step S507. The control circuit unit 120 is configured to output an instruction to generate the visual field image and the transitional image of the virtual camera 300 at the moving destination to the display 112 based on the execution of the above-mentioned processing.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   defining a virtual space for immersing a user, wherein the virtual space comprises a virtual camera, wherein the virtual camera defines field of view image in the virtual space;
   moving the virtual camera within the virtual space in response to a received input, wherein the received input corresponds to a detected movement of a head mounted display (HMD) or a received input from an external controller;
   generating a transitional image in response to moving the virtual camera, wherein the transitional image has reduced information in comparison with the field of view image;
   displaying the field of view image during the moving of the virtual camera, in response to the moving of the virtual camera being synchronized with the detected movement of the HMD; and displaying the transitional image during the moving of the virtual camera, in response to the moving of the virtual camera being without synchronization with the detected movement of the HMD.

2. The method of claim 1, wherein the moving of the virtual camera comprises moving the virtual camera in response to the received input from the external controller.

3. The method of claim 1, wherein the generating of the transitional image comprises reducing information in comparison with the field of view image across an entirety of the transitional image.

4. The method of claim 1, wherein the generating of the transitional image comprises:
    reducing information in comparison with the field of view image at a periphery of the transitional image; and
    maintaining information in comparison with the field of view image at a central region of the transitional image.

5. The method of claim 1, wherein the displaying the field of view image during the moving of the virtual camera comprises displaying the field of view image in response to the speed of the moving of the virtual camera being less than or equal to 307° per second.

6. The method of claim 1, wherein the moving of the virtual camera comprises revolving the virtual camera about an object in the virtual space, and the object remains in the field of view image during the entirety of the moving of the virtual camera.

7. The method of claim 1, wherein the moving of the virtual camera comprises translating the virtual camera in the virtual space, the virtual space comprises an object, and the moving of the virtual camera causes the object to exit the field of view image.

8. The method of claim 1, wherein the generating of the transitional image comprises generating the transitional image in response to at least one of the following conditions:
    translation of the virtual camera in an X-axis direction or a Y-axis direction,
    rotation of the virtual camera about the Y-axis, or
    rotation of the virtual camera about the X-axis.

9. The method of claim 1, wherein the generating of the transitional image comprises generating the transitional image in response to at least one of the following conditions:
    translation of the virtual camera in a Z-axis direction, or
    rotation of the virtual camera about the Z-axis.

10. The method of claim 1, further comprising:
    automatically moving the virtual camera within the virtual space irrespective of a detected movement of the HMD and the received input from the external controller; and
    displaying the transitional image during the automatic moving of the virtual camera.

11. The method of claim 1, further comprising displaying the field of view image during the moving of the virtual camera, regardless of whether the moving of the virtual camera is synchronized or is not synchronized with the detected movement of the HMD, in response to a moving distance of the virtual camera in the virtual space being less than a threshold value.

12. A method comprising:
    defining a virtual space for immersing a user, wherein the virtual space comprises a virtual camera, wherein the virtual camera defines a field of view image in the virtual space;
    moving the virtual camera within the virtual space in response to a detected movement of a head mounted display (HMD);
    displaying the field of view image during the moving of the virtual camera, in response to the moving of the virtual camera being synchronized with the detected movement of the HMD;
    moving the virtual camera from a first position within the virtual space to a second position within the virtual space in response to a received input from an external controller or automatically irrespective of the received input without synchronization with the detected movement of the HMD; and
    displaying the field of view image of a continuous section of the virtual space between the first position and the second position during the moving of the virtual camera, in response to the moving of the virtual camera being without synchronization with the detected movement of the HMD and a speed of the moving of the virtual camera in the virtual space being greater than or equal to a threshold value, wherein the displaying the field of view image during the moving of the virtual camera comprises displaying the field of view image in response to the speed of the moving of the virtual camera being greater than or equal to 307° per second.

13. The method of claim 12, wherein the moving of the virtual camera being without synchronization with the detected movement of the HMD comprises revolving the virtual camera about an axis in the virtual space, and an angular velocity of the moving of the virtual camera being greater than or equal to 200° per second.

14. The method of claim 13, wherein the moving of the virtual camera being without synchronization with the detected movement of the HMD comprises revolving the virtual camera about an axis in the virtual space, and an angular velocity of the moving of the virtual camera being greater than or equal to 250° per second.

* * * * *